No. 733,280. Patented July 7, 1903.

UNITED STATES PATENT OFFICE.

KARL SCHIRMACHER, OF SODEN, GERMANY, ASSIGNOR TO FARBWERKE, VORM. MEISTER, LUCIUS & BRÜNING, OF HÖCHST-ON-THE-MAIN, GERMANY, A CORPORATION OF GERMANY.

RED AZO DYE AND PROCESS OF MAKING SAME.

SPECIFICATION forming part of Letters Patent No. 733,280, dated July 7, 1903.

Application filed April 3, 1903. Serial No. 150,917. (No specimens.)

*To all whom it may concern:*

Be it known that I, KARL SCHIRMACHER, Ph. D., a citizen of the Empire of Germany, residing at Soden, Germany, have invented certain new and useful Improvements in the Manufacture of Red Azo Dyestuff, of which the following is a specification.

If ortho-chlorotoluene-para-sulfonic acid is nitrated and subsequently reduced, an ortho-chlorotoluidin-para-sulfonic acid is obtained, wherein the substitutes

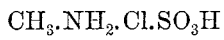

$$CH_3.NH_2.Cl.SO_3H$$

are probably having the position 1:3:6:4. This chlorotoluidin sulfonic acid is little soluble in water. Its sodium salt crystallizes well. When diazotized, this acid yields a diazo compound, which partly separates from the solution if concentrated. I have found that this diazotized chlorotoluidin sulfonic acid may be combined with beta-naphthol to a red azo dyestuff, which is valuable on account of the lakes obtained from it—for instance, the baryum salt—which are distinguished by their shades and fastness.

The manufacture of the dyestuff may be illustrated as follows: To diazotize, the chlorotoluidin sulfonic acid is first finely divided, for which purpose 22.15 kilograms of chlorotoluidin sulfonic acid are dissolved hot in a solution of sodium carbonate, the solution being then rapidly cooled and acidified with hydrochloric acid. Then twenty-two kilograms of hydrochloric acid (of about thirty-three per cent. strength) are added, and the mixture is diazotized with seven kilograms of nitrite. The diazo compound separates partly and is run into a cold solution of 14.6 kilograms of beta-naphthol, twelve kilograms of caustic-soda lye, (of 40° Baumé specific gravity,) and ten kilograms of sodium carbonate. After stirring for some hours the dyestuff is filtered and dried. The azo dyestuff thus obtained is a red powder little soluble in hot water and alcohol. Mineral acids precipitate the acid of the dyestuff from the aqueous solution as brown-red flakes. Concentrated sulfuric acid dissolves the dyestuff to a blue-red, acetic acid to an orange-yellow, solution. With the salts of alkaline earths and heavy metals it is transformed into insoluble salts, which may be used for color-lakes.

Having now described my invention, what I claim is—

1. The herein-described manufacture of a red azo dyestuff, which consists in diazotizing the ortho-chlorotoluidin-para-sulfonic acid obtained by nitrating and reducing the ortho-chlorotoluene-para-sulfonic acid and by combining the former with beta-naphthol, substantially as set forth.

2. As a new product, the azo dyestuff obtained from diazotized ortho-chlorotoluidin-para-sulfonic acid and beta-naphthol, being as its sodium salt a red powder little soluble in hot water and alcohol, soluble in concentrated sulfuric acid to a blue red, in glacial acetic acid to an orange-yellow color; mineral acids precipitate brown-red flakes from the aqueous solution.

In testimony that I claim the foregoing as my invention I have signed my name in presence of two subscribing witnesses.

KARL SCHIRMACHER.

Witnesses:
ALFRED BRISBOIS,
BERNHARD LEYDECKER.